US011449921B2

(12) United States Patent
Tennur Narayanan et al.

(10) Patent No.: US 11,449,921 B2
(45) Date of Patent: Sep. 20, 2022

(54) USING MACHINE LEARNING TO PREDICT A USAGE PROFILE AND RECOMMENDATIONS ASSOCIATED WITH A COMPUTING DEVICE

(71) Applicant: Dell Products L. P., Round Rock, TX (US)

(72) Inventors: Tejas Naren Tennur Narayanan, Austin, TX (US); Gautam Kaura, Austin, TX (US); Stephen Ray Young, Austin, TX (US); Sathish Kumar Bikumala, Round Rock, TX (US); Harshit Mehta, Austin, TX (US); Harshita Dubey, Round Rock, TX (US); Avanthika Sankararaman, Cedar Park, TX (US)

(73) Assignee: Dell Products L.P., Round Rock, TX (US)

(*) Notice: Subject to any disclaimer, the term of this patent is extended or adjusted under 35 U.S.C. 154(b) by 267 days.

(21) Appl. No.: 16/906,062

(22) Filed: Jun. 19, 2020

(65) Prior Publication Data

US 2021/0398187 A1    Dec. 23, 2021

(51) Int. Cl.
*G06Q 30/06* (2012.01)
*G06N 20/00* (2019.01)
*G06Q 10/00* (2012.01)
*G06Q 30/00* (2012.01)
*G06N 5/04* (2006.01)

(52) U.S. Cl.
CPC .......... *G06Q 30/0631* (2013.01); *G06N 5/04* (2013.01); *G06N 20/00* (2019.01); *G06Q 10/20* (2013.01); *G06Q 30/012* (2013.01)

(58) Field of Classification Search
CPC .......... G06Q 10/00–50/00; G06N 3/00–20/00
USPC .............................. 705/7.11–7.42, 26.1–26.9
See application file for complete search history.

(56) References Cited

U.S. PATENT DOCUMENTS

| 5,608,845 | A | * | 3/1997 | Ohtsuka | G07C 3/00 |
| | | | | | 706/45 |
| 6,799,154 | B1 | * | 9/2004 | Aragones | G06F 11/008 |
| | | | | | 703/22 |
| 9,886,723 | B1 | * | 2/2018 | Devereaux | G06K 9/00536 |
| 10,235,631 | B2 | * | 3/2019 | Singh | G06N 7/005 |
| 10,657,454 | B2 | * | 5/2020 | Singh | G05B 23/0283 |
| 11,119,472 | B2 | * | 9/2021 | Gandenberger | G05B 13/04 |

(Continued)

*Primary Examiner* — Alan S Miller
(74) *Attorney, Agent, or Firm* — Krishnendu Gupta; Deepika Bhayana; Derek Lam (57) ABSTRACT

In some examples, a server may receive usage data from a computing device, determine a usage profile of the computing device, and determine that a component of the computing device is predicted to fail and at what time. If the time is within a warranty period of a current warranty, then the server may recommend purchasing an upgraded warranty and provide a cost-benefit analysis of purchasing the upgraded warranty. If the time is outside the warranty period, then the server may recommend purchasing an extended warranty and provide a cost-benefit analysis of purchasing the extended warranty. The server may use the usage data to make a recommendation to upgrade one or more components (e.g., memory, disk drive, network card, or the like) of the computing device. The server may use the usage data to make a recommendation to upgrade from the computing device to a different computing device.

20 Claims, 5 Drawing Sheets

(56) References Cited

U.S. PATENT DOCUMENTS

| | | | |
|---|---|---|---|
| 2002/0091972 A1* | 7/2002 | Harris | G07F 19/20 714/E11.02 |
| 2003/0074294 A1* | 4/2003 | Merkin | G06Q 30/06 705/36 R |
| 2003/0154094 A1* | 8/2003 | Bredemeier | G06Q 30/012 705/302 |
| 2008/0059120 A1* | 3/2008 | Xiao | G06F 11/0748 702/187 |
| 2008/0103785 A1* | 5/2008 | Logan | G06Q 30/012 705/302 |
| 2012/0053983 A1* | 3/2012 | Vittal | G06Q 50/06 705/7.28 |
| 2013/0013517 A1* | 1/2013 | Gallego | G06Q 30/012 705/302 |
| 2016/0035150 A1* | 2/2016 | Barfield, Jr. | G05B 23/0254 701/29.3 |
| 2016/0247177 A1* | 8/2016 | Zamer | G06Q 30/0206 |
| 2017/0323216 A1* | 11/2017 | Fano | G06N 20/00 |
| 2018/0307713 A1* | 10/2018 | Shin | G06N 7/005 |
| 2019/0213600 A1* | 7/2019 | Dinwiddie | G06Q 30/012 |
| 2021/0070258 A1* | 3/2021 | Davies | G07C 5/085 |
| 2021/0174257 A1* | 6/2021 | Pothula | G06F 16/289 |
| 2021/0207827 A1* | 7/2021 | Rowswell | F24F 11/80 |

* cited by examiner

USING MACHINE LEARNING TO PREDICT A USAGE PROFILE AND RECOMMENDATIONS ASSOCIATED WITH A COMPUTING DEVICE

BACKGROUND OF THE INVENTION

Field of the Invention

This invention relates generally to computing devices and, more particularly to a server that receives telemetry data from each of multiple computing devices. The server may use one or more types of machine learning to analyze the telemetry data to predict a usage profile (e.g., identifying how each computing device is being used) and provide recommendations regarding upgrading or extending a warranty, purchasing a new computing device, and the like.

Description of the Related Art

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

When a computer manufacturer (e.g., Dell®) sells a hardware product (e.g., computing device), the product may come with a warranty. For example, the manufacturer may warranty that the product will be free from defects in materials and workmanship for a specified period of time (e.g., 2 years), starting from the date of invoice. In addition, the manufacturer may offer, for an additional fee, additional services, such as, for example, Accidental Damage Service, Hardware Service Agreement (e.g., remote diagnosis of issues, pay only for parts if product is serviced, exchange for same or better product if product cannot be fixed), Premium Support services, and the like. Selling additional services with a product typically increases profitability for the manufacturer and improves customer satisfaction. However, customers may be hesitant to buy an extended warranty or other service agreement due to the price, e.g., the customer may not consider what is being provided has the value for the price.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may receive usage data from a computing device, determine a usage profile of the computing device, and determine that a component of the computing device is predicted to fail and at what time. If the time is within a warranty period of a current warranty, then the server may recommend purchasing an upgraded warranty and provide a cost-benefit analysis of purchasing the upgraded warranty. If the time is outside the warranty period, then the server may recommend purchasing an extended warranty and provide a cost-benefit analysis of purchasing the extended warranty. The server may use the usage data to make a recommendation to upgrade one or more components (e.g., memory, disk drive, network card, or the like) of the computing device. The server may use the usage data to make a recommendation to upgrade from the computing device to a different computing device.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O)

devices, such as a keyboard, a mouse, touchscreen and/or video display. The information handling system may also include one or more buses operable to transmit communications between the various hardware components.

A computer manufacturer, such as, for example, Dell®, may electronically provide (e.g., via a software pop-up window) an offer to a client who has purchased a computing device from the manufacturer. For example, the offer may be to activate (or install and activate) a software agent (e.g., Dell® Support Assist or similar) on the computing device that does one or more of the following: (i) periodically checks for and installs software and firmware updates, (ii) scans (e.g., tests) hardware components of the computing device, (iii) modifies the configuration of the computing device to improve computing performance (e.g., reduce usage of resources such as central processing unit (CPU), memory, and the like) and improve network performance (e.g., increase transmission speed, reduce dropped packets, and the like), (iv) scan for and remove malware and viruses, (v) determines a current warranty status of the computing device, or any combination thereof. If the client accepts the offer, the server may instruct the computing device to activate the software agent if the software agent is pre-installed or provide an installer to install the software agent on the computing device.

After the software agent is activated, the software agent may gather various types of data. For example, the software agent may gather logs, such as installation logs, resource usage logs, and the like generated by components of the computing device, including hardware components, software components (e.g., including drivers), and firmware components (including a basic input output system (BIOS) of the computing device). The software agent may gather sensor data generated by one or more sensors included in the computing device. For example, the sensors may include an accelerometer (e.g., a sudden motion sensor, such as a triaxial accelerometer, also called a g-force sensor), a gyroscope, a location sensor (e.g., global positioning system (GPS)), barometer (to detect a sudden change in altitude), a thermometer inside the computing device, and the like. The sensor data may be gathered to determine whether the computing device is subject to sudden movements, such as being dropped or being bumped. The software agent may gather usage data associated with the software and hardware components of the computing device, such as, for example, a minimum, an average, and a maximum associated with a number of software applications that are simultaneously executing at any given time, which software applications were executing, the amount of resources (e.g., memory, storage, network bandwidth, CPU resources such as a number of cores, CPU cycles, and the like) being used, a length of time that the computing device is being used every day, a temperature inside the computing device, and the like.

The software agent may periodically (e.g., at a predetermined time interval) or in response to a particular set of events (e.g., multiple restarts within a particular time interval, multiple crashes by a particular software application within a particular time interval, and the like), send the gathered data (also referred to as telemetry data) to a server associated with the manufacturer. The server may analyze the data using one or more machine learning algorithms to determine a usage profile identifying how a user of the computing device is using the computing device, e.g., which software applications are being used, an amount of time each application is being used, when (e.g., time of day, day of the week, and the like) the application is being used, which hardware components are being used, which peripherals have been or are currently connected to the computing device, and the like. The usage profile may include what percentage of the time the computing device is at a particular location of multiple locations where the computing device spends time. For example, a user may take a laptop back and forth from home to work. As another example a user may travel with the laptop to various locations during the week. The usage profile may indicate whether the computing device experiences sudden movements, such as being dropped, being bumped, being jostled and the like. For example, the sensor data may indicate sudden changes in location (e.g., sudden upward motion, sudden downward motion, sudden sideways motion, sudden twisting motion, and the like) indicating that the computing device has been dropped, bumped, or subject to other types of sudden movements.

Based on the usage profile, the server may use one or more machine learning algorithms to make various predictions such as, for example, whether one or more hardware components of the computing device are predicted to fail, how much of the current warranty the user is predicted to use, a cost-benefit analysis to date of the warranty, a projected cost benefit analysis (e.g., up until just prior to expiration of the warranty), and the like.

Based on the usage profile and the current warranty, the machine learning algorithms may make one or more recommendations to the user of the computing device. For example, the recommendations may include purchasing an extended warranty, changing from a higher-level warranty to a lower-level warranty (e.g., from Gold to Silver, from Silver to Bronze, from Premium Plus to Premium and the like), changing from a lower-level warranty to a higher-level warranty (e.g., from Bronze to Silver, from Silver to Gold, from Premium to Premium Plus, and the like), purchasing a cloud-based data backup plan, upgrading to a new computing device, and the like.

Along with each recommendation, the machine learning algorithms may provide one or more reasons (e.g., based on usage data, usage patterns, service calls by the user to technical support, and the like) why the recommendation provides value to the user. For example, a recommendation that the user switch from a lower-level warranty to a higher-level warranty may include reasons such as, based on the number of service requests (e.g., requests by the user to technical support) made by the user the user would benefit from the additional value that the higher-level warranty provides, such as in-home service, guaranteed today repair or replace, or the like. As another example, a recommendation that the user switch from a higher-level warranty to a lower-level warranty may include reasons indicating that the user is not using the computing device frequently and is therefore not using many of the features provided by the higher-level warranty, e.g., the user is paying for warranty features that the user is not making use of. As yet another example, a recommendation that the user purchase an extended warranty may include a reason indicating that (i) the average use of the computing device by the user is greater than an average usage of other users with similar computing devices, (ii) based on data gathered from other computing devices using a same particular component (or similar components), a particular component is predicted to fail within a particular period of time based on the usage, (iii) based on the usage and/or the temperature data, the machine learning has predicted a temperature of components inside the computing device and has predicted one or more components may fail within a particular period of time, or any combination thereof. Thus, the machine learning may predicted a component failure (e.g., random access memory (RAM), disk drive, Central Processing Unit (CPU), or the like) may occur within a particular time period, making the extended warranty provide value to the user because the extended warranty provides the user with benefits (e.g., fast repair or replacement under the extended warranty with fewer out-of-pocket expenses) should the particular component fail as predicted. As a further example, the machine learning may recommend that the user purchase a cloud-based data backup service to periodically backup the contents of the computing device to a cloud server to enable the user to preserve the contents in the event of a component failure that renders the computing device inoperable. As an additional example, the machine learning may recommend that the user upgrade to a different computing device based on the usage data associated with the current computing device. For example, to improve execution time of frequently used applications, the different computing device may have (i) more and/or faster storage (e.g., a solid-state drive rather than a mechanical disk drive), (ii) a faster processor, (iii) a processor with more cores, (iv) a processor with a faster clock speed, (v) a faster networking card, (vi) more random access memory (RAM), (vii) ruggedized features to protect the computing device from accidental bumps/drops, and the like, (vii) faster ports (e.g., universal serial bus (USB) 3.0 rather than 2.0) to enable faster access to peripheral devices connected to the computing device, other improvements, or any combination thereof. In this way, the telemetry data provided by the computing device may be used by the server to identify and quantify reasons why the user should purchase an extended warranty, change in existing warranty the level, purchase a backup service, upgrade to a different computing device, or any combination thereof. For example, based on the usage data, the machine learning may determine that the computing device is being used to execute computing resource intensive applications (e.g., Adobe® Illustrator, Adobe® Photoshop, or the like) and recommend that the user upgrade from the current computing device (e.g., Dell® XPS 15) to a different computing device (e.g., Dell® Precision) that is capable of running the applications significantly faster. As another example, based on the usage data, the machine learning may determine that the computing device is being used to execute computer gaming applications and recommend that the user upgrade from the current computing device (e.g., Dell® XPS 15) to a different computing device (e.g., Dell® Alienware) that is capable of running the applications significantly faster.

For example, a server may include one or more processors and one or more non-transitory computer-readable storage media to store instructions executable by the one or more processors to perform various operations. The operations may include receiving telemetry data from a computing device. For example, the telemetry data may be sent by the computing device at either: (i) a predetermined time interval (e.g., every N days, where N>0) or in response to determining that a predetermined set of events (e.g., multiple restart, multiple application crashes, or the like) have occurred within a predetermined time period (e.g., M minutes, where M>0). The telemetry data may include usage data and sensor data. For example, the usage data may identify a minimum, an average, and a maximum of an amount of usage of: (i) a first amount of time of a central processing unit (CPU) of the computing device, (ii) a second amount of a memory of the computing device, and (iii) a third amount of a storage device of the computing device. The sensor data may be generated by one or more sensors of the computing device including, for example, one or more of: an accelerometer, a gyroscope, a global positioning system (GPS) sensor, a barometer, or a thermometer. The operations may include storing the telemetry data with previously received telemetry data. The operations may include determining, by a machine learning algorithm and based on the telemetry data and on the previously received telemetry data, a usage profile associated with the computing device. The operations may include determining service request data that includes service requests associated with the computing device. The operations may include predicting, using the machine learning algorithm and based on the usage profile and the service request data: (i) a failure of a component of the computing device and (ii) a time when the component is predicted to fail. The operations may include determining, based on the time that the component is predicted to fail, that the component is predicted to fail outside a warranty period of a current warranty and determining, using the machine learning algorithm, an estimated cost to repair the computing device outside the warranty period of the current warranty. The operations may include determining, based on a purchase date of the computing device and the current warranty associated with the computing device, a warranty option comprising an extended warranty and performing, using the machine learning algorithm, a cost-benefit analysis based on: (i) an out-of-pocket cost associated with repairing the computing device outside the warranty period of the current warranty and (ii) a cost to purchase the extended warranty. The operations may include providing a recommendation comprising purchasing the extended warranty and the cost-benefit analysis. The operations may include predicting, using the machine learning algorithm and based on the usage profile and the service request data: (i) a second failure of a second particular component of the computing device and (ii) a second time when the second particular component is predicted to fail. The operations may include determining, based on the second time that the second particular component is predicted to fail, that the second particular component is predicted to fail within the warranty period of the current warranty and determining, using the machine learning algorithm, a second estimated cost to repair the computing device within the warranty period of the current warranty. The operations may include determining, based on the purchase date of the computing device and the current warranty associated with the computing device, a second warranty option comprising an upgraded warranty (e.g., Premium to Premium Plus, Bronze to Silver, Solver to Gold, or the like). The upgraded warranty may provide additional benefits not provided (or provided in a reduced amount) by a standard warranty (e.g., the warranty provided by the manufacturer with the purchase of the computing device). The operations may include performing, using the machine learning algorithm, a second cost-benefit analysis based on: (i) a second out-of-pocket cost associated with repairing the computing device within the warranty period of the current warranty and (ii) a cost to purchase the upgraded warranty. The operations may include providing a second recommendation to purchase the upgraded warranty, the second recommendation including the second cost-benefit analysis. The operations may include determining, using the machine learning algorithm and based on the usage profile, that upgrading a particular component of the computing device is predicted to increase a speed to execute a particular task on the computing device, determining a cost to upgrade the particular component, and providing a component upgrade recommendation to upgrade the particular component of the computing device, the recommendation including the speed at which the particular task is predicted to execute. For example, component upgrade recommendation may include a recommendation to (i) add more random access memory (RAM), (ii) add a higher capacity and/or a faster storage device, such a solid state drive, (iii) replace a network interface card (NIC) with a NIC capable of great bandwidth/ throughput, or any combination thereof. The operations may include determining, using the machine learning algorithm and based on the usage profile, that upgrading from the computing device to a different computing device is predicted to increase a speed to execute a particular task on the computing device, determining a cost to upgrade to the different computing device, and providing a device upgrade recommendation to upgrade from the computing device to the different computing device, the device upgrade recommendation including the speed at which the particular task is predicted to execute. The operations may include re-training the machine learning algorithm using the telemetry data and the previously received telemetry data, thereby updating the machine learning algorithm to improve accuracy. If more than one machine learning algorithm is being used, then each machine learning algorithm may be independently retrained using the telemetry data and the previously received telemetry data.

Figure 1:
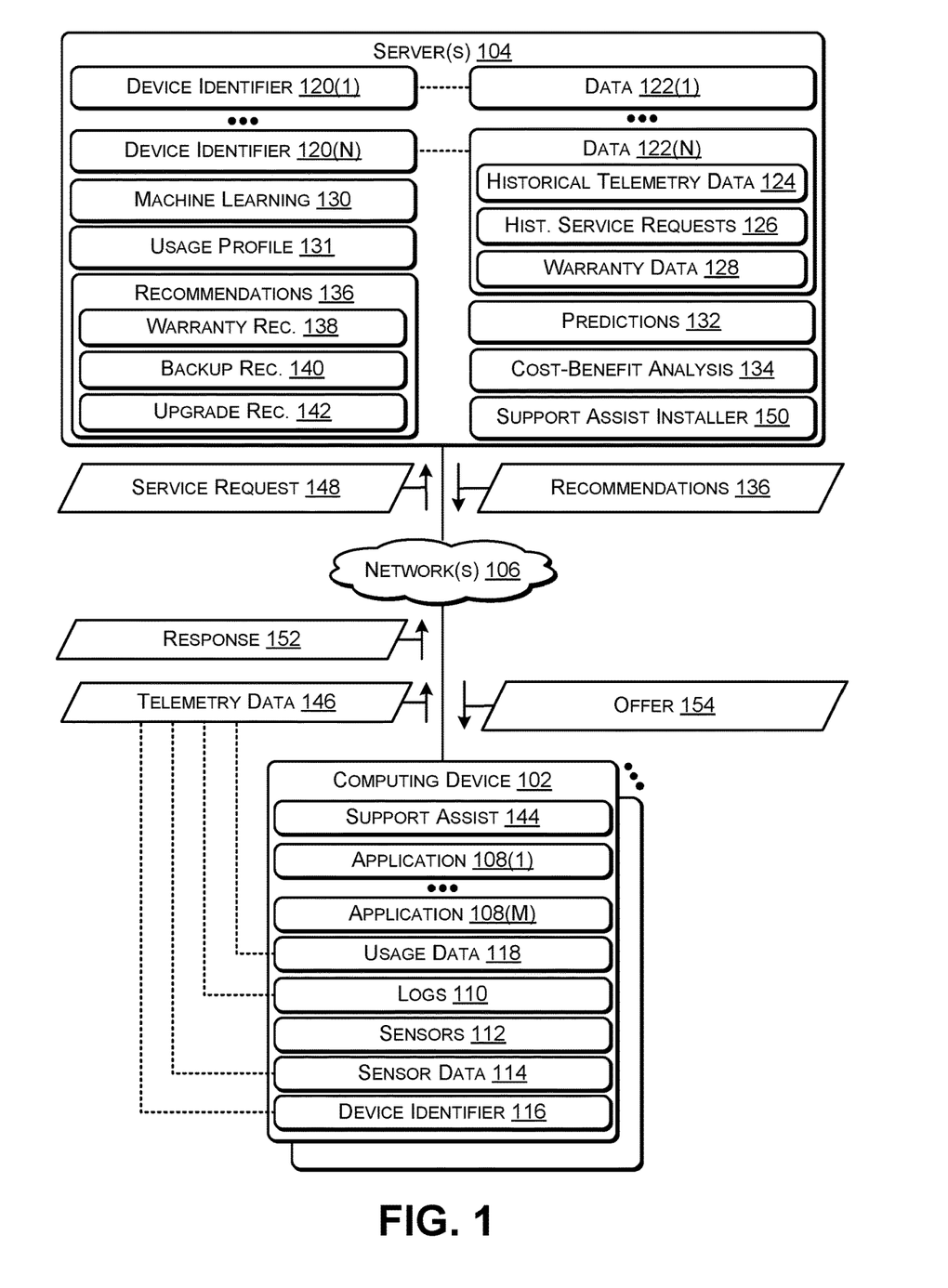
FIG. 1 is a block diagram of a system that includes multiple computing devices sending data to a server, according to some embodiments.

FIG. 1 is a block diagram of a system 100 that includes multiple computing devices sending data to a server, according to some embodiments. The system 100 may include multiple computing devices, such as a representative computing device 102, coupled to one or more servers 104 via one or more networks 106. For example, the servers 104 may be cloud-based servers associated with a manufacturer of the computing device 102. The network 106 may include multiple networks, including a local area network, a wide area network, a wireless network, a wired network, another type of network, or any combination thereof.

The computing device 102 may include multiple applications, such as an application 108(1) to an application 108(M) (M>0). As described herein, the applications 108 may include an operating system of the computing device 102. The applications 108 may generate one or more logs 110. For example, when a particular application of the applications 108 is being installed, the particular application may generate an installation log of the logs 110. If the particular application encounters a problem (e.g., unable to allocate a resource such as memory, unable to communicate with another application, unable to obtain a resource from the operating system, or the like), the particular application may generate an error log of the logs 110.

The computing device 102 may include multiple sensors 112, such as, for example, an accelerometer (e.g., a sudden motion sensor, such as a triaxial accelerometer, also called a g-force sensor), a gyroscope, a location sensor (e.g., global positioning system (GPS)), barometer (to detect a sudden change in altitude), a thermometer (e.g., to measure an internal temperature of the computing device 102), and the like. The sensors 112 may generate sensor data 114. For example, if the computing device 102 is a portable device (e.g., a laptop or a tablet), then the sensors 112 may generate the sensor data 114, including information as to which locations the computing device 102 is moved to and from (e.g., from home to work and back to home, from work to different locations, and the like), whether the computing device 102 is subject to sudden movements, such as being dropped, and other information related to movement associated with the computing device 102. The computing device 102 may include a device identifier 116 that uniquely identifies the computing device 102 from among other computing devices. For example, the device identifier 116 may be a serial number, a service tag, or another type of unique device identifier (e.g., media access control (MAC) address).

A support assist software application ("support assist") 144 (e.g., a software agent) may be preinstalled on the computing device 102 by the manufacturer prior to the computing device 102 being acquired (e.g., leased or purchased) by a user. If the support assist 144 has been removed from the computing device 102, the server 104 may provide a support assist installer 150 that the computing device 102 can download to install and activate the support assist 144 on the computing device 102.

The support assist 144 may monitor the applications 108 to create usage data 118 associated with how the applications 108 are used, including how frequently (e.g., N times in a particular time interval, such as day, week, month, N>0) each of the applications 108 are used, how many resources (e.g., memory, storage, CPU cores, CPU cycles, and the like) each of the applications 108 uses (e.g., minimum resource usage, maximum resource usage, average resource usage, and the like), how much bandwidth of the network 106 each of the applications 108 uses, how long (e.g., minimum, maximum, average) each of the applications 108 is used in a particular time interval (e.g., every N days, N>0), and other usage related information associated with the applications 108.

The support assist 144 may send telemetry data 146 to the server 104 periodically (e.g., at a predetermined time interval, such as every N hours, N>0) or in response to detecting a particular set of events (e.g., more than a particular number of operating system restarts within a particular period of time, more than a particular number of application crashes within a particular period of time, more than a particular number of high priority logs of the logs 110 generated within a particular period of time, and the like). The telemetry data 146 may include (i) the usage data 118 associated with usage of the applications 108 and the computing resources associated with the computing device 102, (ii) the logs 110, (iii) the sensor data 114, and (iv) the device identifier 116. When the server 104 receives the telemetry data 146, the server 104 may determine which particular computing device the telemetry data 146 is associated with based on the device identifier 116 and store the telemetry data 146 accordingly.

When a user of the computing device 102 encounters an issue that the user is unable to resolve or that renders the computing device 102 inoperable or difficult to operate (e.g., screen is unviewable, keyboard is difficult to use, applications are slow to respond, or the like), the user may generate a service request 148. If the computing device 102 is under warranty, then the manufacturer of the computing device 102 may cover at least a portion of the costs associated with troubleshooting and fixing the issue associated with the computing device 102. If the computing device 102 is no longer under warranty, then the user may pay out-of-pocket the costs associated with having a technician troubleshoot and fix the issue.

The server 104 may receive the telemetry data 146 from multiple computing devices. including, for example, the representative computing device 102. Previously gathered data 122(1) may be associated with a device identifier 120(1) associated with a first computing device and previously gathered data 122(N) may be associated with a device identifier 120(N) associated with an Nth computing device (N>0). For example, for the computing device 102, the device identifier 116 may be one of the device identifiers 120 stored at the server 104 and the telemetry data 146 may be stored with a corresponding one of the associated data 122. To illustrate, the data 122(N) (e.g., associated with a computing device having the device identifier 120(N)) may include historical telemetry data 124, historical service request data 126 and warranty data 128. The warranty data 128 may indicate a current warranty associated with the corresponding computing device identified by the device identifier 120(N). The current warranty may be (i) a basic warranty (e.g., 2 years) provided by the manufacturer as part of the sale of the computing device, (ii) an upgraded warranty (e.g., Support Plus (Silver) or Support Plus Ultimate (Gold)) or (iii) an extended warranty (e.g., extending the warranty period past the time that the basic warranty is set to expire, e.g., past 2 years) purchased by the user with or after the purchase of the computing device. The historical service requests 126 may include service requests associated with the computing device identified by the device identifier 120. For example, each service request may be a call to a service phone number provided by the manufacturer, a chat session with support personnel on a website maintained by the manufacturer, an email sent by the user to support personnel of the manufacturer, or another type of service request associated with the computing device 102. The historical telemetry data 124 may include accumulated telemetry data sent by the corresponding computing device (e.g., identified by the device identifier 120) starting from when the support assist 144 was activated.

For example, assume that device identifier 120(N) is associated with the computing device 102 (e.g., the device identifier 120(N) comprises the device identifier 116). In this example, the telemetry data 146 may be stored and included in the historical telemetry data 124, the service request 148 may be included in the historical service requests 126, and the warranty data 128 may identify a current warranty, such a standard warranty, an upgraded warranty, or an extended warranty associated with the computing device 102.

The server 104 may include one or more machine learning algorithms 130 to perform various actions, including determining a usage profile 131 associated with a user of a computing device, determining one or more predictions 132 associated with the computing device (e.g., when one or more components are predicted to fail), determining a cost-benefit analysis 134, analyzing a current warranty and the associated service requests of the computing device (e.g., "By upgrading to a higher-level or extended warranty you saved $M in out-of-pocket expenses because your service requests were covered by the warranty", M>0), providing one or more recommendations 136, or any combination thereof. The machine learning algorithms 130 may include one or more of types of supervised learning, such as, for example, Support Vector Machines (SVM), linear regression, logistic regression, naive Bayes, linear discriminant analysis, decision trees, k-nearest neighbor algorithm, Neural Networks such as Multilayer perceptron or similarity learning, or the like.

The usage profile 131 may identify how a user is utilizing a particular computing device (e.g., the computing device 102). For example, the machine learning 130 may process the telemetry data 124 and determine that a user of the particular computing device is one of: (i) a frequent user (e.g., a power user who uses more than an average amount of computer resources more than an average amount of time as compared to an average user), (ii) an average user whose computer resource usage and average amount of time that the computer is used is within a range (e.g., middle section of a bell curve) considered to be average, (iii) an infrequent user whose computer resource usage and average amount of time that the computer is used is below the average range. As another example, the usage profile 131 may take into account how much physical movements (e.g., sudden movements) to which the computing device is subject. For example, a user that travels frequently (e.g., for business) and takes their computing device with them (e.g., through airport security checkpoints and the like) or a user that moves around within a particular location (e.g., within a room, within a building, or within a city) and subjects the computing device to sudden movements (e.g., bumps and drops) may be considered a heavy user. A user that travels infrequently or does not move the computing device frequently may be considered an average user. A user that leaves the computing device in a particular location and rarely moves the computing device may be considered a light user. While these examples use three levels to describe the usage profile 131, the usage profile 131 may be a number from 1 to 10, where 1, 2, 3 progressively indicate an infrequent and/or light user, 4, 5, 6, 7 indicate progressively indicate a relatively average user, and 8, 9, and 10 progressively indicate a frequent and/or heavy user. Progressively means that for M>N, M is a heavier and/or more frequent user compared to N (0<N<=10, 0<M<=10). Of course, the usage profile 131 may use another type of numerical indicator, such as a fraction between 0 and 1, an integer between 0 and 100, or the like.

In some cases, the usage profile 131 may take into account both how the user is utilizing the computing device 102 and the physical movements to which the computing device 102 is subject. For example, a first weight may be used with a first score identifying how much the user is utilizing the computing device 102 and a second weight may be used with the second score identifying how much physical movement the computing device 102 is being subject to. The sum of the weighted scores may be used to determine the usage profile 131.

The machine learning 130 may use the usage profile 131 and the telemetry data 124 to make predictions 132. For example, the predictions 132 may predict when a particular computing device may have a hardware component failure. For example, based on historical data associated with computing devices that use one or more of the same (or similar) hardware components as the particular computing device, the predictions 132 may indicate that a mechanical hard drive may fail due to heat within a chassis of the computing device, the frequency of sudden movements, the amount of movement in each sudden movement, an amount of force that the computing device 102 is subject to with each sudden movement, and the like. As another example, based on historical data associated with computing devices that use the same or similar hardware components as the particular computing device, the predictions 132 may indicate that a particular component (e.g., a processor or a random-access memory (RAM)) of the particular computing device may fail. To illustrate, the usage data of the particular computing device may indicate that the particular component reaches a high temperature and that the lifespan of the particular component is shortened when the particular component operates at the high temperature for an extended period of time every day for multiple consecutive days. The predictions 132 may indicate that the heavy computing resource usage (e.g., multiple applications are executing for at least P hours every day (e.g., P>6), physical movements the computing device is subject to (e.g., frequent sudden movements), or both may result in one or more components failing.

Based on the predictions 132, the recommendations 136 may include a warranty recommendation 138 to purchase an extended warranty or upgrade from a current warranty to a higher level warranty (e.g., Bronze to Silver, Silver to Gold, Premium to Premium Plus, or the like), a backup recommendation 140 to purchase a data backup service (e.g., to protect against data loss), an upgrade recommendation of (i) a component of the computing device 102 or (ii) to a different computing device, or any combination thereof. For example, the upgrade recommendation 142 may recommend having the manufacturer upgrade the disk drive of the computing device 102 to a solid state drive (SSD) to improve the speed of disk input/output, increase a size of random access memory (RAM) to reduce swapping to disk and increase execution speed, replace the networking card with a networking card that can provide more bandwidth/ faster transmission and receiving, add a card with faster ports (e.g., USB 3.0 instead of USB 2.0) to improve speeds when accessing peripheral devices attached to the ports, and the like. As another example, the upgrade recommendation 142 may indicate to the user that, based on the usage data 118, the user may have an improved user experience by upgrading to a new (e.g., different) computing device. For example, the upgrade recommendation 142 may specify a particular computer model and indicate that upgrading to the particular computer model would increase execution speed of the applications 108 that the user frequently executes by a particular percentage (e.g., 20%, 30%, 50% or the like) and explain the reasons why. To illustrate, the upgrade recommendation 142 may specify that upgrading to a faster processor with more cores and having a solid-state drive would improve execution of the user's Z (Z>0) most frequently used applications. For example, the usage data 118 may indicate that one or more of the applications 108 that are frequently executed use a significant amount of computer resources (e.g., CPU, RAM, storage, networking bandwidth, and the like) and by upgrading to a different computing device, the execution speed of the frequently executed applications 108 may be increased to increase their throughput. To illustrate, the usage data 118 may indicate that the user is using one or more applications, such as Adobe® Illustrator, Adobe® Photoshop, or other computing resource intensive applications, and the upgrade recommendation 142 may recommend that the user upgrade from the current computing device 102 (e.g., Dell® XPS 15) to a different computing device (e.g., Dell® Precision) that is capable of executing the applications much faster. As another illustration, the usage data 118 may indicate that the user is using a gaming application, and the upgrade recommendation 142 may recommend that the user upgrade from the current computing device 102 (e.g., Dell® XPS 15) to a different computing device (e.g., Dell® Alienware) that is designed to execute gaming applications much faster.

The machine learning 130 may perform a cost-benefit analysis 134 based on the telemetry data 124, the service requests 126 and the warranty data 128 (which includes a price of the current warranty). For example, the machine learning 130 may determine that the user purchased an extended warranty when the computing device was initially purchased and determine, based on the number of service requests 126 associated with the particular computing device, that the user has saved $X (X>0) as compared to not purchasing the extended warranty and paying out-of-pocket for technical services provided as a result of the service requests 126. Thus, the cost-benefit analysis 134 may provide quantifiable data indicating how much the user saved by purchasing the extended warranty. Alternately, if the user did not purchase an extended warranty, the cost-benefit analysis 134 may indicate that, had the user purchased an extended warranty, the user could have saved $Y (Y>0) based on the number and type of service requests 126 made by the user. Thus, if the user has already purchased an extended warranty, the cost-benefit analysis 134 may indicate the value of the extended warranty to the user and the recommendations 136 may include the warranty recommendation 138 to purchase an extension to the extended warranty (e.g., moving the expiration date of the current extended warranty out a predetermined amount of time, such as one year, two years, or the like). If the user has not purchased an extended warranty, then the cost-benefit analysis 134 may indicate the value of the extended warranty had the user purchased the extended warranty. In either case, the recommendations 136 may include the cost-benefit analysis 134 while making one or more of the recommendations 138, 140, 142 to quantify the value of the current warranty and the value of the warranty recommendation 138.

In addition to gathering the usage data 118, the logs 110, and the sensor data 114, and sending the telemetry data 146 to the server, the support assist 144 may (i) periodically check for and install software and firmware updates, (ii) scan (e.g., test) hardware components of the computing device 102, (iii) modify a configuration of the computing device 102 to improve computing performance (e.g., reduce usage of resources such as central processing unit (CPU), memory, storage, and the like) and improve network performance (e.g., increase transmission speed, reduce dropped packets, and the like), (iv) scan for and remove malware and viruses, (v) determine a current warranty status of the computing device, or any combination thereof.

In some cases, the support assist 144 may come preinstalled on the computing device 102. In such cases, the support assist 144 may provide the user with an offer 154 to activate the support assist 144 to perform various functions, such as to check for and install software (e.g., including drivers and operating system) and firmware updates, scan hardware components to determine if the components are working correctly, modify a configuration of the computing device 102 to improve computing performance, improve network performance, identify and remove malware and viruses, determine a current warranty status of the computing device, and the like. If the user sends a response 152 in which the user accepts the offer 154, then the support assist 144 may be activated on the computing device.

In some cases, the support assist 144 may not be preinstalled on the computing device 102 or may have been removed from the computing device 102. In such cases, the server 104 may provide the offer 154 to install and activate the support assist 144 on the computing device 102. The offer 154 may identify the advantages provided by the support assist 144, such as downloading and installing software and firmware updates, modifying a configuration of the computing device to improve throughput, and so on. If the user sends the response 152 indicating that the user accepts the offer 154, then the server 104 may provide a support assist installer 150 to enable the user to install the support assist 144 on the computing device 102.

As the server 104 receives additional telemetry data from the multiple computing devices, the server 104 may periodically (e.g., every T months, T>0) re-train the machine learning 130 with the additional telemetry data to improve an accuracy of the machine learning 130. In some cases, the machine learning 130 may include multiple machine learning algorithms. For example, a first machine learning algorithm may be used to determine the usage profile 131, a second machine learning algorithm may be used to determine the predictions 132, a third machine learning algorithm may be used to determine the cost-benefit analysis 134, and a fourth machine learning algorithm may be used to determine the recommendations 136.

Thus, users may be provided an offer to install and/or activate the support assist to enable the manufacturer of the computing device to analyze the user's usage and make recommendations regarding an extended warranty, purchasing a cloud-based backup service, and upgrading to a different computing device. Telemetry data from the users is captured and sent to a server for analysis using machine learning. The server may provide a cost benefit analysis of the current warranty and recommendations (e.g., including upgrading or downgrading a current warranty). In this way, the manufacturer can increase profits by selling additional services and improve customer satisfaction.

Figure 2:
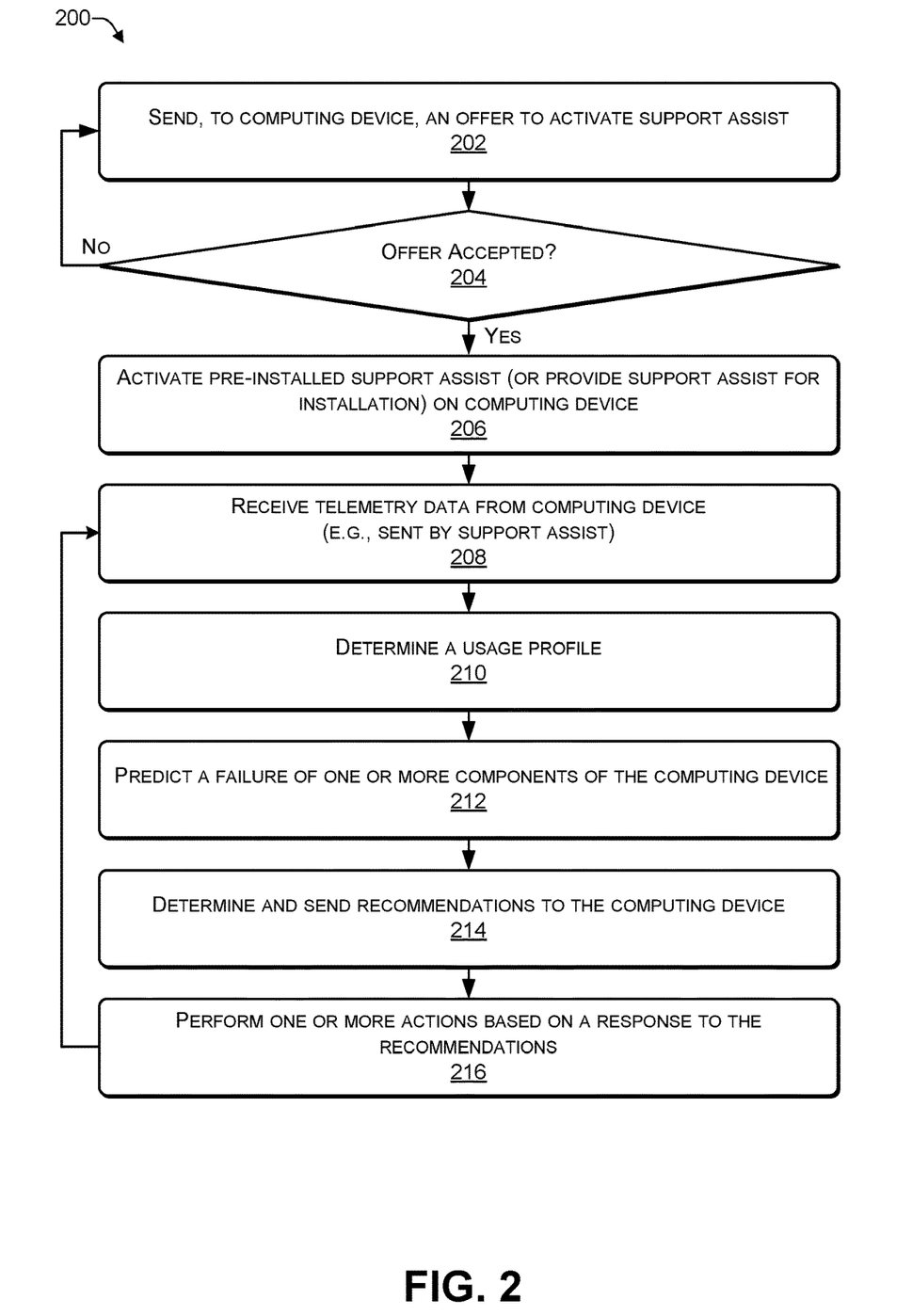
FIG. 2 is a flowchart of a process that includes receiving telemetry data from a computing device, according to some embodiments.
Figure 3:
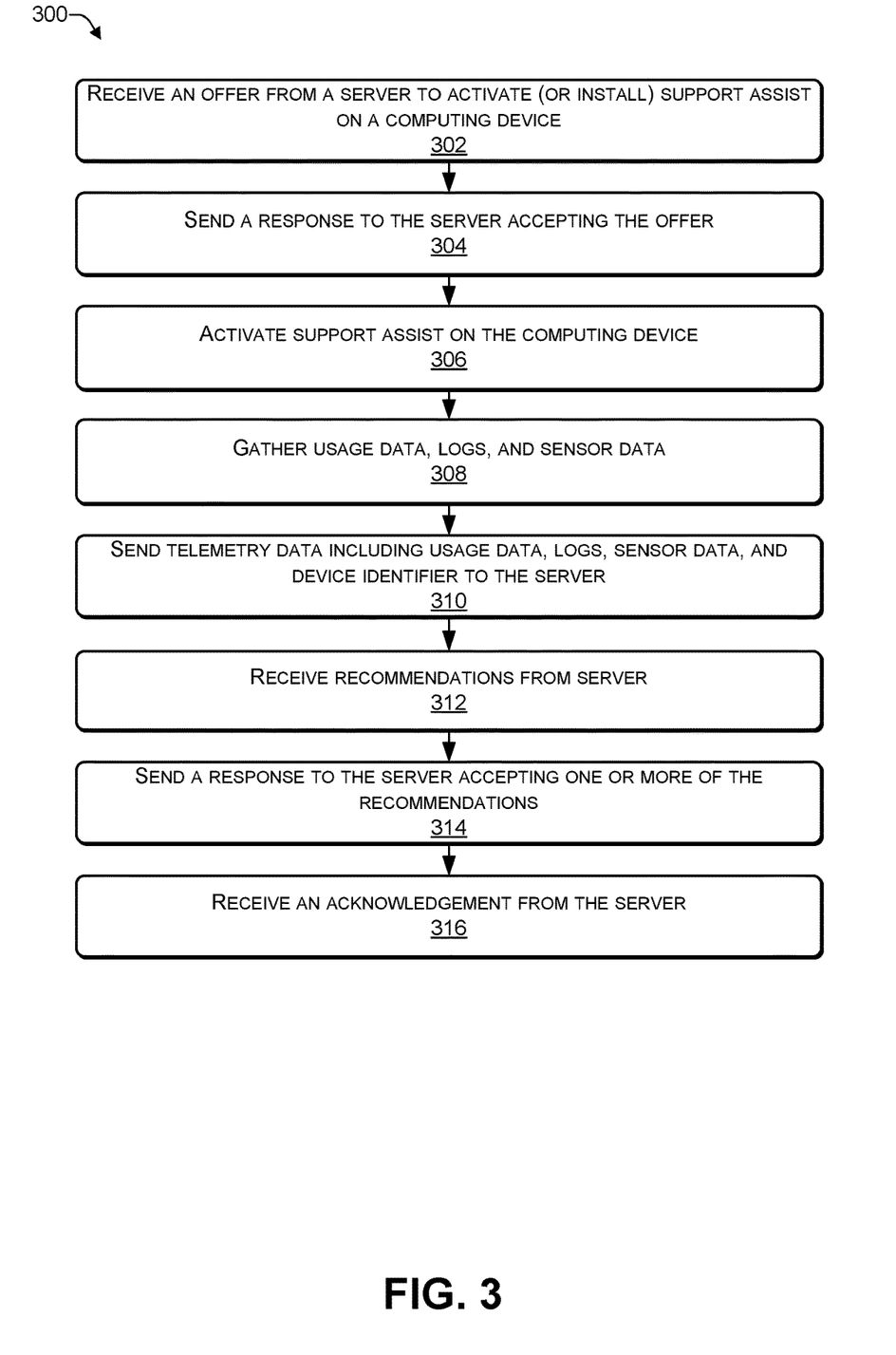
FIG. 3 is a flowchart of a process that includes receiving recommendations from a server, according to some embodiments.
Figure 4:
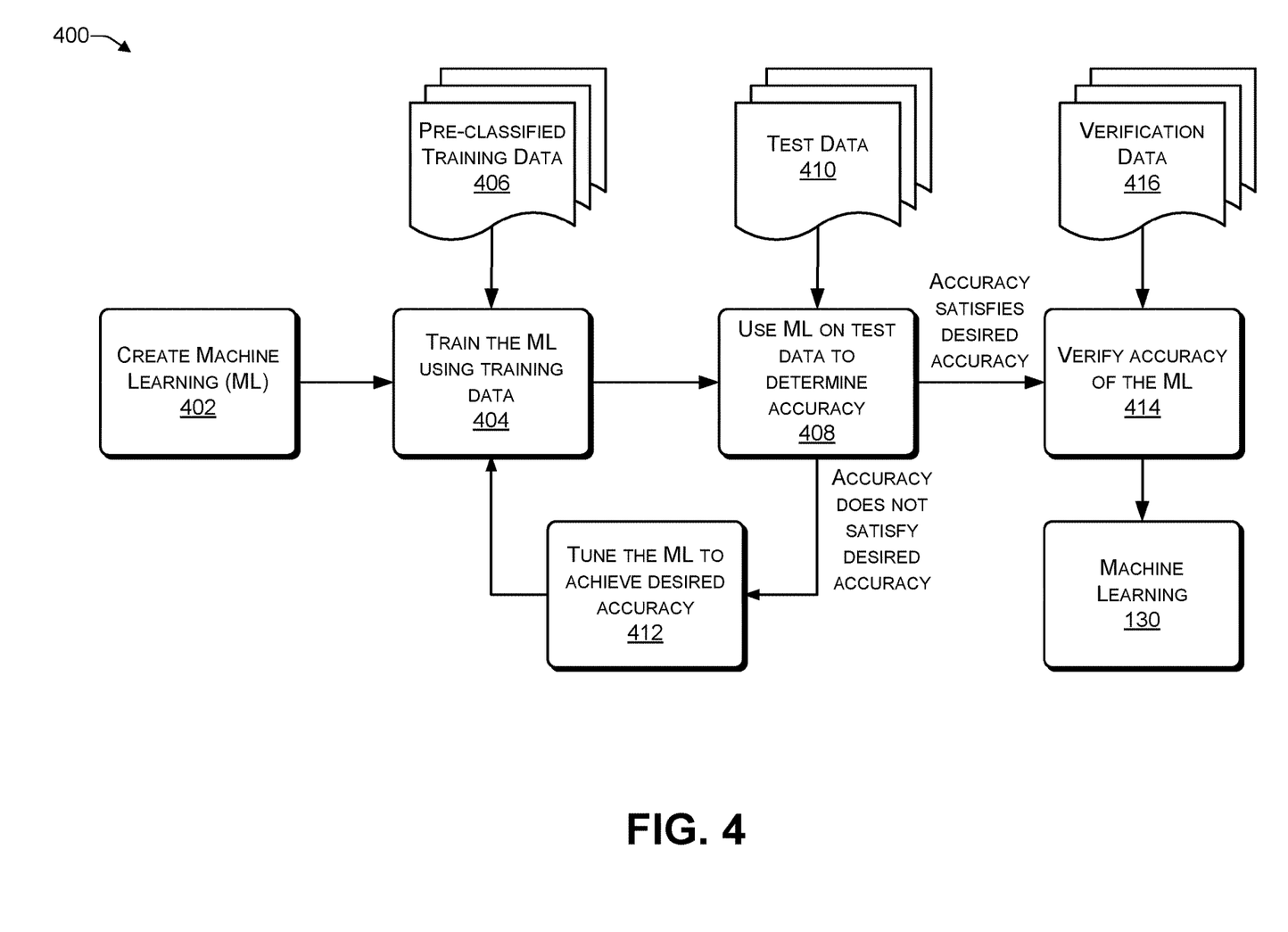
FIG. 4 is a flowchart of a process to train a machine learning algorithm, according to some embodiments.

In the flow diagrams of FIGS. 2, 3, and 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, and 400 are described with reference to FIG. 1, as described above, although other models, frameworks, systems and environments may be used to implement this process.

FIG. 2 is a flowchart of a process 200 that includes receiving telemetry data from a computing device, according to some embodiments. For example, the process 200 may be performed by the server 104 of FIG. 1.

At 202, the process may send an offer to activate (or install and activate) support assist to a computing device. At 204, the process may determine whether the offer was accepted. If the process determines, at 204, that the offer was not accepted then the process may proceed to 202, where the offer may be presented at a later point in time. If the process determines, at 204, that the offer was accepted, then the process may proceed to 206, where the preinstalled support assist may be activated or the computing device may be instructed to download and install the support assist. For example, in FIG. 1, the server 104 may send the offer 154 to the computing device 102. The offer 154 may be displayed to a user of the computing device 102. The offer 154 may include information about the functionality provided by the support assist 144, such as automatically finding and installing software (including device driver) updates and firmware updates, scanning hardware components of the computing device 102 to determine whether the components are functioning correctly, scanning for and removing viruses and malware, automatically modifying a configuration of the computing device 102 to improve an execution speed of the applications 108, making recommendations, including warranty recommendations, another function provided by support assist, or any combination thereof. By providing information about the functionality provided by the support assist 144, the offer 154 may identify the benefits to the user to accept the offer 154 to activate support assist 144.

At 208, the process may receive telemetry data from the computing device (e.g., sent by support assist). For example, in FIG. 1, the server 104 may receive the telemetry data 146 sent by the support assist 144 from the computing device 102. The support assist 144 may send the telemetry data 146 to the server 104 at a predetermined time interval or in response to determining that a set of predetermined events occurred within a predetermined time (e.g., operating system restarted M times within P seconds, one or more of the applications 108 crashed within P seconds, and the like, M>0, P>0).

At 210, the process may determine a usage profile associated with the computing device. For example, in FIG. 1, the server 104 may store the telemetry data 146 in the corresponding data 122 based on the device identifier 116 in the telemetry data 146 that uniquely identifies the computing device 102. The server 104 may analyze the data 122 corresponding to the computing device 102 using the machine learning 130 to determine the usage profile 131.

At 212, the process may predict the failure of one or more components of the computing device. For example, in FIG. 1, the server 104 may use the machine learning 130 and the usage profile 131 along with the data 122 to make one or more predictions 132 regarding of failure of one or more components of the computing device 102. For example, if the similar or same component used in the computing device 102 is prone to failure in computing devices with a similar usage profile, then the machine learning 130 may predict in the predictions 132 that a particular component of the computing device 102 is likely to fail. In some cases, the machine learning 130 may make a prediction as to whether the component may fail during a current warranty or after the current warranty has expired. In such cases, the recommendations 136 may indicate that when the component is predicted to fail to indicate the benefit to the user of purchasing the warranty recommendation 138. For example, if a particular component of the computing device 102 is predicted to fail after the current warranty has expired, the warranty recommendation 138 may include a recommendation to purchase an extended warranty that extends the end date of the current warranty such that if the particular component fails, the repair of the computing device 102 is covered under the extended warranty.

At 214, the process may determine and send one or more recommendations to the computing device. For example, in FIG. 1, the server 104 may use the machine learning 130 to determine the recommendations 136 and send the recommendations 136 to the computing device 102. The recommendations 136 may include a warranty recommendation 138, a backup recommendation 140, and an upgrade recommendation 142. The warranty recommendation 138 may include a recommendation to upgrade the current warranty to an upgraded warranty (e.g., from Bronze to Silver, from Silver to Gold, from Premium to Premium Plus, or the like) and may include the cost-benefit analysis 134. For example, based on the historical service requests 126, the cost-benefit analysis 134 may indicate a benefit (e.g., how much the user has saved by not having to pay out-of-pocket for repairs, two day turnaround for repairs, replacement with a refurbished or new computing device having similar or better capabilities if the computing device 102 is unrepairable, and the like) the user has received from the current warranty. The backup recommendation 140 may recommend that the user purchase a data backup service offered by the manufacturer of the computing device 102 to prevent data loss in the event of a component failure. The upgrade recommendation 142 may include a recommendation to upgrade one or more components of the computing device 102 or to upgrade from the computing device 102 to a different computing device.

For example, based on the usage data 118, the upgrade recommendation 142 may recommend that the user increase the amount of RAM, increase the amount of storage space, upgrade from a mechanical disk drive to a solid state drive, upgrade from a networking card that uses an older protocol to a newer networking card that uses a newer and faster protocol, and the like. As another example, the upgrade recommendation 142 may recommend that the user upgrade from the current computing device 102 to a new computing device. For example, the usage data 118 may indicate that peripherals that use USB 3.0 are connected to the computing device 102 but the computing device 102 only has USB 2.0 ports. The upgrade recommendation 142 may suggest the user upgrade to a new computing device that has USB 3.0 ports to improve the input/output operations associated with the one or more peripherals. The upgrade recommendation 142 may recommend that, based on the usage data 118, the user is using applications that consume a significant amount of computing resources and the user would obtain faster execution of the applications by upgrading to a workstation, such as Dell® Precision. The upgrade recommendation 142 may recommend that, based on the usage data 118, the user is using gaming applications and recommend upgrading to a new computing device designed for gaming, such as Dell® Alienware because the gaming applications will execute faster on the new computing device.

At 216, the process may perform one or more actions based on a response to the recommendations. The process may then proceed to 208, to receive additional telemetry data (sent by support assist) from the computing device. For example, in FIG. 1, after providing the offer 154, the user of the computing device 102 may send the response 152 to the server 104. The server 104 may perform one or more actions based on the response 152. For example, the server 104 may automatically purchase a warranty (e.g., upgrade or extended warranty) specified in the warranty recommendation 138 for the computing device 102. As another example, the server 104 may automatically purchase a data backup service and link it to the computing device 102. As a further example, the server 104 may automatically schedule a component upgrade for the computing device 102. As yet another example, the server 104 may automatically initiate a purchase of a new computing device to be shipped to a location of the user of the computing device 102.

Thus, a server may offer to activate a support assist software application on a computing device. The support assist may provide various functions including collecting usage data, logs, and sensor data and sending the collected data as telemetry data to the server. The server may store the telemetry data with other telemetry data previously sent by the computing device. The server may analyze the telemetry data to determine a usage profile to identify how the computing device is being used. Based on the usage profile, the server may make one or more predictions as to whether any of the components of the computing device will fail and whether they are likely to fail within the current warranty or after the current warranty has expired. The server may use historical service requests and the current warranty to perform a cost-benefit analysis of the current warranty. The server may use the predictions and information associated with warranties available for purchase to determine a cost-benefit analysis of purchasing a new warranty. The server may provide one or more recommendations including a recommendation associated with upgrading or extending the current warranty, purchasing a data backup service, and upgrade recommendations to upgrade one or more components of the computing device or to upgrade from the current computing device to a new computing device that is more suitable for the user based on the usage profile. In this way, the manufacturer is able to increase profits by selling additional products and services, such as upgraded or extended warranties, while at the same time increasing customer satisfaction by providing customers with warranties that are selected based on the user's usage profile. In addition, if the user is a frequent and/or heavy user, the manufacturer may price an extended warranty or an upgraded warranty higher than for a user that is an infrequent and/or light user. For example, if the telemetry data indicates that the computing device is subject to frequent sudden movements and/or high usage, the manufacturer may price an extended warranty or upgraded warranty accordingly (e.g., a higher price than the same or similar warranty for an average user). As another example, if the telemetry data indicates that the computing device is relatively stationary and/or infrequently used, then the extended warranty or upgraded warranty may be priced accordingly (e.g., a lower price than the same or similar warranty for an average user). In some cases, the server may use multiple machine learning algorithms. For example, a first machine learning algorithm may be used to determine the usage profile, a second machine learning algorithm may be used to determine the predictions, a third machine learning algorithm may be used to perform the cost-benefit analysis, and a fourth machine learning algorithm may be used to provide the recommendations.

FIG. 3 is a flowchart of a process 300 that includes receiving recommendations from a server, according to some embodiments. The process 300 may be performed by a computing device, such as the representative computing device 102 of FIG. 1.

At 302, the process may receive an offer from a server to activate (or install) support assist (e.g., software agent) on a computing device. At 304, the process may send a response to the server accepting the offer. At 306, the support assist may be activated on the computing device. For example, in FIG. 1, the computing device 102 may receive an offer 154 to activate the support assist 140 for that is preinstalled on the computing device 102. The offer 154 may provide information about the functionality provided by the support assist 144, such as automatically identifying, downloading, and installing software updates and firmware updates, scanning (e.g., testing) hardware components of the computing device, modifying a configuration of the computing device 102 to improve an execution speed of one or more of the applications 108, modifying parameters of a network interface card to increase transmission and/or receiving speeds, determining a current warranty and available warranties for purchase, other functionality, or any combination thereof. If the user provides a selection indicating acceptance of the offer 154, the server 104 may instruct the computing device 1022 activate the support assist 144.

At 308, the process may gather usage data and logs associated with one or more applications executing on the computing device and sensor data generated by one or more sensors of the computing device. At 310, the process may send telemetry data including the usage data, the logs, the sensor data, and a device identifier that uniquely identifies the computing device to the server. For example, in FIG. 1, the support assist 144 may gather usage data 118 associated with the applications 108, such as how often the applications 108 are being used, a length of time (e.g., minimum, maximum, average) that each of the applications 108 are being used, an amount of the computing resources (e.g., CPU cores, CPU cycles, RAM, storage, networking bandwidth, and the like) that each of the applications 108 are using, and other usage related data. The support assist 144 may gather logs 110 generated by the applications 108, such as installation logs, error logs, and other types of logs. The support assist 144 may gather the sensor data 114 generated by the sensors 112 indicating how frequently (e.g., minimum, maximum, average) the computing device 102 is being moved, how far (e.g., minimum, maximum, average) the computing device 102 is being moved, how frequently the computing device 102 experiences sudden movements, a time period (e.g., minimum, maximum, average) associated with each sudden movement, an amount (e.g., minimum, maximum, average) of a g-force that the computing device experiences, a distance (e.g., minimum, maximum, average) associated with each sudden movement, an internal temperature (e.g., minimum, maximum, average) of the computing device 102, and other sensor related data. The support assist 144 may send the usage data 118, the logs 110, and the sensor data 114, along with the device identifier 116 (e.g., that uniquely identifies the computing device 102) as the telemetry data 146 to the server 104.

At 312, the process may receive one or more recommendations from the server. At 314, the process may send a response to the server accepting one or more of the recommendations. At 316, the process may receive an acknowledgment from the server. For example, in FIG. 1, after the server 104 has analyzed the telemetry data 146, the server may send the recommendations 136 to the computing device 102. The recommendations 136 may include a warranty recommendation 138 to upgrade to an upgraded warranty or purchase an extended warranty that extends an end date of the current warranty, a backup recommendation to purchase a data backup service, and an upgrade recommendation to upgrade one or more components of the computing device 102 or two upgrade from the computing device 102 to a different computing device that can, based on the usage profile 131, execute the applications 108 faster than the computing device 102.

Thus, a user may receive an offer to activate a preinstalled support assist software application. The support assist may gather and provide telemetry data indicating how the computing device is being used and how the computing device is being treated (e.g., is it being subject to sudden movements, such as drops and/or bumps) to enable the server to determine a usage profile of the computing device and provide one or more recommendations regarding a warranty and upgrades to one or more components or to the computing device itself. In this way, the manufacturer of the computing device may be able to upsell a warranty, a backup service, and component upgrades or a computer upgrade, thereby increasing profits and improving the user's experience by providing recommendations that are based on the usage profile of the computing device.

FIG. 4 is a flowchart of a process 400 to train a machine learning algorithm, according to some embodiments. The process 400 may be performed by the server 104 of FIG. 1.

At 402, the machine learning algorithm (e.g., software code) may be created by one or more software designers. At 404, the machine learning algorithm may be trained using pre-classified training data 406. For example, the training data 406 may have been pre-classified by humans, by machine learning, or a combination of both. After the machine learning has been trained using the pre-classified training data 406, the machine learning may be tested, at 408, using test data 410 to determine an accuracy of the machine learning. For example, in the case of a classifier (e.g., support vector machine), the accuracy of the classification may be determined using the test data 410.

If an accuracy of the machine learning does not satisfy a desired accuracy (e.g., 95%, 98%, 99% accurate), at 408, then the machine learning code may be tuned, at 412, to achieve the desired accuracy. For example, at 412, the software designers may modify the machine learning software code to improve the accuracy of the machine learning algorithm. After the machine learning has been tuned, at 412, the machine learning may be retrained, at 404, using the pre-classified training data 406. In this way, 404, 408, 412 may be repeated until the machine learning is able to classify the test data 410 with the desired accuracy.

After determining, at 408, that an accuracy of the machine learning satisfies the desired accuracy, the process may proceed to 414, where verification data for 16 may be used to verify an accuracy of the machine learning. After the accuracy of the machine learning is verified, at 414, the machine learning 130, which has been trained to provide a particular level of accuracy may be used.

The process 400 may be used to train each of multiple machine learning algorithms. For example, in FIG. 1, a first machine learning may be used to determine the usage profile 131, a second machine learning may be used to determine the predictions 132, a third machine learning may be used to perform the cost-benefit analysis 134, and a fourth machine learning may be used to determine the recommendations 136.

Figure 5:
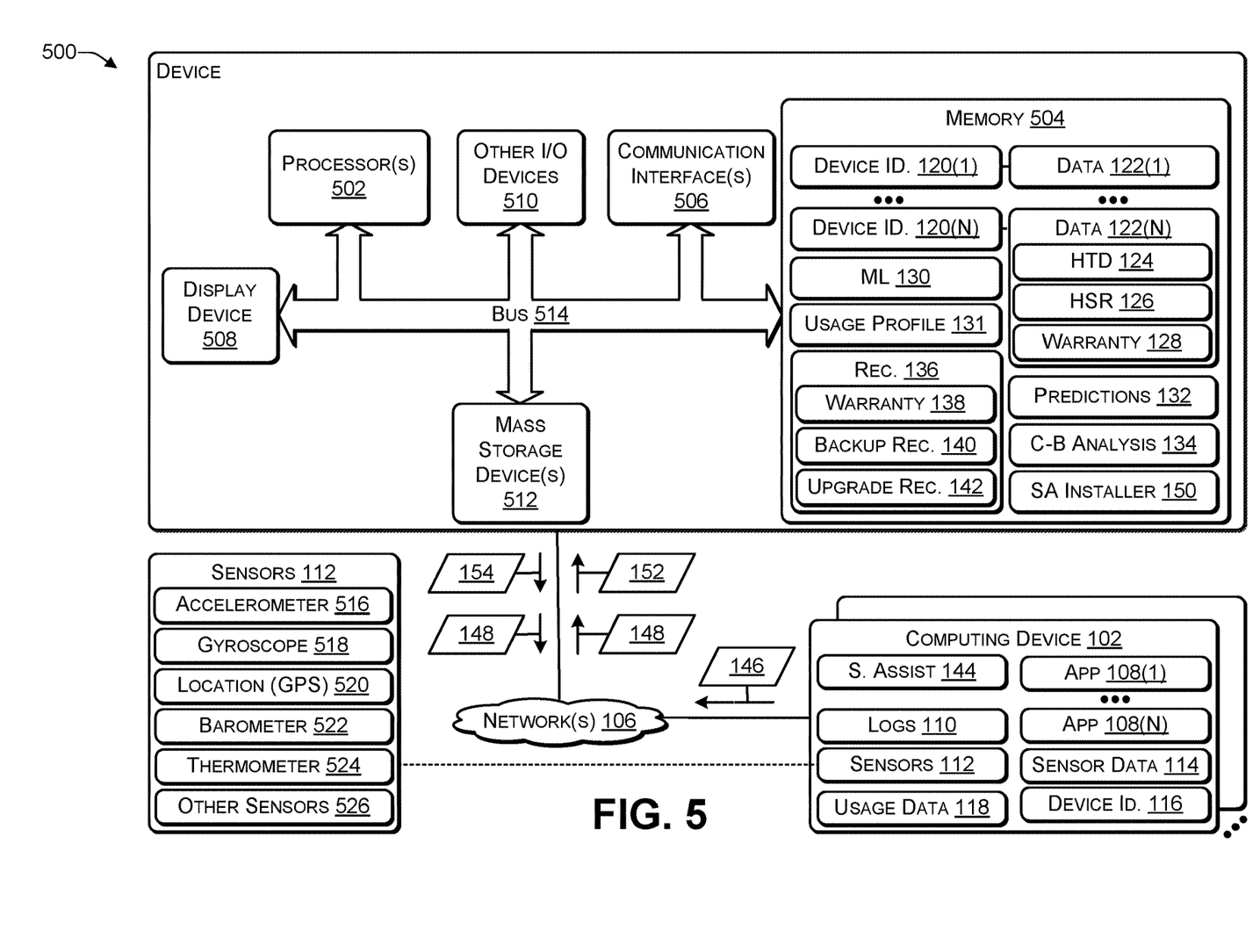
FIG. 5 illustrates an example configuration of a computing device that can be used to implement the systems and techniques described herein.

FIG. 5 illustrates an example configuration of a device 500 that can be used to implement the systems and techniques described herein, such as for example, the computing devices 102 and/or the server 104 of FIG. 1. As an example, the device 500 is illustrated in FIG. 5 as implementing the server 104 of FIG. 1.

The device 500 may include one or more processors 502 (e.g., CPU, GPU, or the like), a memory 504, communication interfaces 506, a display device 508, other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The device 500 may include one or more communication interfaces 506 for exchanging data via the network 110. The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images) to users. Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data. For example, the computer storage media may be used to store the data 122 associated with a corresponding device identifier 120, the machine learning 130, the usage profile 131, the predictions 132, the cost-benefit analysis 134, the support assist installer 150, and the recommendations 136.

The sensors 112 in each computing device, such as the representative computing device 102, may include one or more of the following sensors: an accelerometer 516, a gyroscope 518, a location sensor (e.g., global positioning system (GPS)) 520, barometer 522, a thermometer 524, and other sensors 526. The accelerometer 516 may measure an acceleration (the rate of change of velocity) of the computing device 102. The accelerometer 516 may use multiple-axis (e.g., tri-axial) to determine vibration, shock, and falling (e.g., dropping) of the computing device 102. The gyroscope 518 may measure an orientation and angle of the computing device 102. The location sensor 520 may determine a particular location of the computing device 102 at any given point in time in 3-dimensional space. The barometer 522 may measure air pressure to determine a current altitude of the computing device 102. The thermometer 524 may measure a current temperature inside an enclosure (e.g., chassis) of the computing device 102. The other sensors 526 may include other types of sensors.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
receiving telemetry data from a computing device, wherein the telemetry data comprises usage data and sensor data;
storing the telemetry data with previously received telemetry data;
determining, by a machine learning algorithm and based on the telemetry data and on the previously received telemetry data, a usage profile associated with the computing device;
determining service request data comprising service requests associated with the computing device;
predicting, using the machine learning algorithm and based on the usage profile and the service request data:
a failure of a component of the computing device; and
a time when the component is predicted to fail;
determining, based on the time that the component is predicted to fail, that the component is predicted to fail outside a warranty period of a current warranty;
determining, using the machine learning algorithm, an estimated cost to repair the computing device outside the warranty period of the current warranty;
determining, based on a purchase date of the computing device and the current warranty associated with the computing device, a warranty option comprising an extended warranty;
performing, using the machine learning algorithm, a cost-benefit analysis based on:

an out-of-pocket cost associated with repairing the computing device outside the warranty period of the current warranty; and a cost of the extended warranty;

providing a recommendation to purchase the extended warranty, the recommendation including the cost-benefit analysis; and re-training the machine learning algorithm using the telemetry data and the previously received telemetry data.

2. The computer-implemented method of claim 1, further comprising:

predicting, using the machine learning algorithm and based on the usage profile and the service request data:

a second failure of a second particular component of the computing device; and a second time when the second particular component is predicted to fail;

determining, based on the second time that the second particular component is predicted to fail, that the second particular component is predicted to fail within the warranty period of the current warranty;

determining, using the machine learning algorithm, a second estimated cost to repair the computing device within the warranty period of the current warranty;

determining, based on the purchase date of the computing device and the current warranty associated with the computing device, a second warranty option comprising an upgraded warranty;

performing, using the machine learning algorithm, a second cost-benefit analysis based on:

a second out-of-pocket cost associated with repairing the computing device within the warranty period of the current warranty; and a cost to purchase the upgraded warranty; and providing a second recommendation to purchase the upgraded warranty, the second recommendation including the second cost-benefit analysis.

3. The computer-implemented method of claim 1, further comprising:

determining, using the machine learning algorithm and based on the usage profile, that upgrading a particular component of the computing device is predicted to increase a speed to execute a particular task on the computing device;

determining a cost to upgrade the particular component; and providing a component upgrade recommendation to upgrade the particular component of the computing device including the speed at which the particular task is predicted to execute.

4. The computer-implemented method of claim 1, further comprising:

determining, using the machine learning algorithm and based on the usage profile, that upgrading from the computing device to a different computing device is predicted to increase a speed to execute a particular task on the computing device;

determining a cost to upgrade to the different computing device; and providing a device upgrade recommendation to upgrade from the computing device to the different computing device including the speed at which the particular task is predicted to execute.

5. The computer-implemented method of claim 1, wherein the usage data identifies a minimum, an average, and a maximum of an amount of usage of:

a first amount of time of a central processing unit (CPU) of the computing device;

a second amount of a memory of the computing device; and a third amount of a storage device of the computing device.

6. The computer-implemented method of claim 1, wherein the sensor data is generated by sensors comprises one or more of:

an accelerometer;

a gyroscope;

a global positioning system (GPS) sensor;

a barometer; or a thermometer.

7. The computer-implemented method of claim 1, wherein the telemetry data is sent by the computing device at:

a predetermined time interval; and in response to determining that a predetermined set of events have occurred within a predetermined time period.

8. A server comprising:

one or more processors; and one or more non-transitory computer readable media storing instructions executable by the one or more processors to perform operations comprising:

receiving telemetry data from a computing device, wherein the telemetry data comprises usage data and sensor data;

storing the telemetry data with previously received telemetry data;

determining, by a machine learning algorithm and based on the telemetry data and based on the previously received telemetry data, a usage profile associated with the computing device;

determining service request data comprising service requests associated with the computing device;

predicting, using the machine learning algorithm and based on the usage profile and the service request data:

a failure of a component of the computing device; and a time when the component is predicted to fail;

determining, based on the time that the component is predicted to fail, that the component is predicted to fail outside a warranty period of a current warranty;

determining, using the machine learning algorithm, an estimated cost to repair the computing device outside the warranty period of the current warranty;

determining, based on a purchase date of the computing device and the current warranty associated with the computing device, a warranty option comprising an extended warranty;

performing, using the machine learning algorithm, a cost-benefit analysis based on:

an out-of-pocket cost associated with repairing the computing device outside the warranty period of the current warranty; and a cost to purchase the extended warranty;

providing a recommendation to purchase the extended warranty, the recommendation including the cost-benefit analysis; and re-training the machine learning algorithm using the telemetry data and the previously received telemetry data.

9. The server of claim 8, the operations further comprising:
  predicting, using the machine learning algorithm and based on the usage profile and the service request data:
    a second failure of a second particular component of the computing device; and
    a second time when the second particular component is predicted to fail;
  determining, based on the second time that the second particular component is predicted to fail, that the second particular component is predicted to fail within the warranty period of the current warranty;
  determining, using the machine learning algorithm, a second estimated cost to repair the computing device within the warranty period of the current warranty;
  determining, based on the purchase date of the computing device and the current warranty associated with the computing device, a second warranty option comprising an upgraded warranty;
  performing, using the machine learning algorithm, a second cost-benefit analysis based on:
    a second out-of-pocket cost associated with repairing the computing device within the warranty period of the current warranty; and
    a cost of the upgraded warranty; and
  providing a second recommendation to purchase the upgraded warranty, the second recommendation including the second cost-benefit analysis.

10. The server of claim 9, the operations further comprising:
  determining, using the machine learning algorithm and based on the usage profile, that upgrading a particular component of the computing device is predicted to increase a speed to execute a particular task on the computing device;
  determining a cost to upgrade the particular component; and
  providing a component upgrade recommendation to upgrade the particular component of the computing device including the speed at which the particular task is predicted to execute.

11. The server of claim 8, the operations further comprising:
  determining, using the machine learning algorithm and based on the usage profile, that upgrading from the computing device to a different computing device is predicted to increase a speed to execute a particular task on the computing device;
  determining a cost to upgrade to the different computing device; and
  providing a device upgrade recommendation to upgrade from the computing device to the different computing device including the speed at which the particular task is predicted to execute.

12. The server of claim 8, wherein the usage data identifies a minimum, an average, and a maximum of an amount of usage of:
  a first amount of time of a central processing unit (CPU) of the computing device;
  a second amount of a memory of the computing device; and
  a third amount of a storage device of the computing device.

13. The server of claim 8, wherein the sensor data is generated by sensors comprises one or more of:
  an accelerometer;
  a gyroscope;
  a global positioning system (GPS) sensor;
  a barometer; or
  a thermometer.

14. One or more non-transitory computer-readable media storing instructions executable by one or more processors to perform operations comprising:
  receiving telemetry data from a computing device, wherein the telemetry data comprises usage data and sensor data;
  storing the telemetry data with previously received telemetry data;
  determining, by a machine learning algorithm and based on the telemetry data and based on the previously received telemetry data, a usage profile associated with the computing device;
  determining service request data comprising service requests associated with the computing device;
  predicting, using the machine learning algorithm and based on the usage profile and the service request data:
    a failure of a component of the computing device; and
    a time when the component is predicted to fail;
  determining, based on the time that the component is predicted to fail, that the component is predicted to fail outside a warranty period of a current warranty;
  determining, using the machine learning algorithm, an estimated cost to repair the computing device outside the warranty period of the current warranty;
  determining, based on a purchase date of the computing device and the current warranty associated with the computing device, a warranty option comprising an extended warranty;
  performing, using the machine learning algorithm, a cost-benefit analysis based on:
    an out-of-pocket cost associated with repairing the computing device outside the warranty period of the current warranty; and
    a cost of the extended warranty;
  providing a recommendation to purchase the extended warranty, the recommendation including the cost-benefit analysis; and
  re-training the machine learning algorithm using the telemetry data and the previously received telemetry data.

15. The one or more non-transitory computer readable media of claim 14, the operations further comprising:
  predicting, using the machine learning algorithm and based on the usage profile and the service request data:
    a second failure of a second particular component of the computing device; and
    a second time when the second particular component is predicted to fail;
  determining, based on the second time that the second particular component is predicted to fail, that the second particular component is predicted to fail within the warranty period of the current warranty;
  determining, using the machine learning algorithm, a second estimated cost to repair the computing device within the warranty period of the current warranty;
  determining, based on the purchase date of the computing device and the current warranty associated with the computing device, a second warranty option comprising an upgraded warranty;

performing, using the machine learning algorithm, a second cost-benefit analysis based on:
  a second out-of-pocket cost associated with repairing the computing device within the warranty period of the current warranty; and
  a cost to purchase the upgraded warranty; and
providing a second recommendation comprising purchasing the upgraded warranty.

16. The one or more non-transitory computer readable media of claim 14, the operations further comprising:
  determining, using the machine learning algorithm and based on the usage profile, that upgrading a particular component of the computing device is predicted to increase a speed to execute a particular task on the computing device;
  determining a cost to upgrade the particular component; and
  providing a component upgrade recommendation to upgrade the particular component of the computing device including the speed at which the particular task is predicted to execute.

17. The one or more non-transitory computer readable media of claim 14, the operations further comprising:
  determining, using the machine learning algorithm and based on the usage profile, that upgrading from the computing device to a different computing device is predicted to increase a speed to execute a particular task on the computing device;
  determining a cost to upgrade to the different computing device; and
  providing a device upgrade recommendation to upgrade from the computing device to the different computing device including the speed at which the particular task is predicted to execute.

18. The one or more non-transitory computer readable media of claim 14, wherein the usage data identifies a minimum, an average, and a maximum of an amount of usage of:
  a first amount of time of a central processing unit (CPU) of the computing device;
  a second amount of a memory of the computing device; and
  a third amount of a storage device of the computing device.

19. The one or more non-transitory computer readable media of claim 14, wherein the sensor data comprises one or more of:
  an accelerometer;
  a gyroscope;
  a global positioning system (GPS) sensor;
  a barometer; or
  a thermometer.

20. The one or more non-transitory computer readable media of claim 14, wherein the telemetry data is sent by the computing device at:
  a predetermined time interval; and
  in response to determining that a predetermined set of events have occurred within a predetermined time period.

* * * * *